United States Patent
Curro et al.

(10) Patent No.: US 6,506,329 B1
(45) Date of Patent: *Jan. 14, 2003

(54) METHOD FOR MAKING A STABLE NONWOVEN WEB HAVING ENHANCED EXTENSIBILITY IN MULTIPLE DIRECTION

(75) Inventors: John Joseph Curro, Cincinnati, OH (US); Douglas Herrin Benson, West Harrison, IN (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/600,470
(22) PCT Filed: Jan. 23, 1998
(86) PCT No.: PCT/US98/01359
§ 371 (c)(1), (2), (4) Date: Jul. 17, 2000
(87) PCT Pub. No.: WO99/37840
PCT Pub. Date: Jul. 29, 1999
(51) Int. Cl.$^7$ .......................... B29C 55/14; B29C 59/04
(52) U.S. Cl. ................ 264/283; 264/284; 264/287; 264/288.4; 264/290.2; 156/62.4; 156/62.8; 156/181; 156/209; 156/229; 156/245; 156/296
(58) Field of Search ...................... 264/284, 283, 264/287, 288.4, 290.2; 156/62.4, 62.8, 181, 209, 229, 245, 296

(56) References Cited

U.S. PATENT DOCUMENTS

| | | | | |
|---|---|---|---|---|
| 4,189,344 A | * | 2/1980 | Busker | 162/117 |
| 4,913,911 A | * | 4/1990 | Wildt | 156/209 |
| 4,919,877 A | * | 4/1990 | Parsons et al. | 156/183 |
| 4,965,122 A | * | 10/1990 | Morman | 428/326 |
| 5,226,992 A | * | 7/1993 | Morman | 156/181 |
| 5,244,482 A | * | 9/1993 | Hassenboehler et al. | 55/528 |
| 5,914,084 A | * | 6/1999 | Benson et al. | 156/209 |
| 6,129,801 A | * | 10/2000 | Benson et al. | 156/196 |

FOREIGN PATENT DOCUMENTS

| | | | | |
|---|---|---|---|---|
| WO | WO-97/47264 A1 | * | 12/1997 | A61F/13/15 |
| WO | WO-98/05813 A1 | * | 2/1998 | D04H/13/00 |
| WO | WO-98/45520 A1 | * | 10/1998 | D04H/1/54 |
| WO | WO-98/48091 A1 | * | 10/1998 | D04H/1/54 |

* cited by examiner

*Primary Examiner*—Jan H. Silbaugh
*Assistant Examiner*—Michael I. Poe
(74) *Attorney, Agent, or Firm*—Jeffrey R. Moore; David M. Weirich; Ken K. Patel

(57) ABSTRACT

The present invention provides a stable material having enhanced extensibility and a method for making the same. A neckable material is fed in a first direction. The neckable material is subjected to incremental stretching in a direction perpendicular to the first direction. A tensioning force is applied to the neckable material to neck the material in a direction perpendicular to the first direction. The necked material is then subjected to mechanical stabilization to provide a stabilized extensible necked material. The stabilized extensible necked material is then passed between the peripheral surface of a cylinder which is driven in rotating motion and a device for pressing the stabilized extensible necked material against the peripheral surface of the cylinder. A retarding member retards the passage of the stabilized extensible necked material and directs the material away from the peripheral surface of the cylinder. The stabilized extensible necked material is easily extended in a direction parallel to the first direction and perpendicular to the first direction.

19 Claims, 5 Drawing Sheets

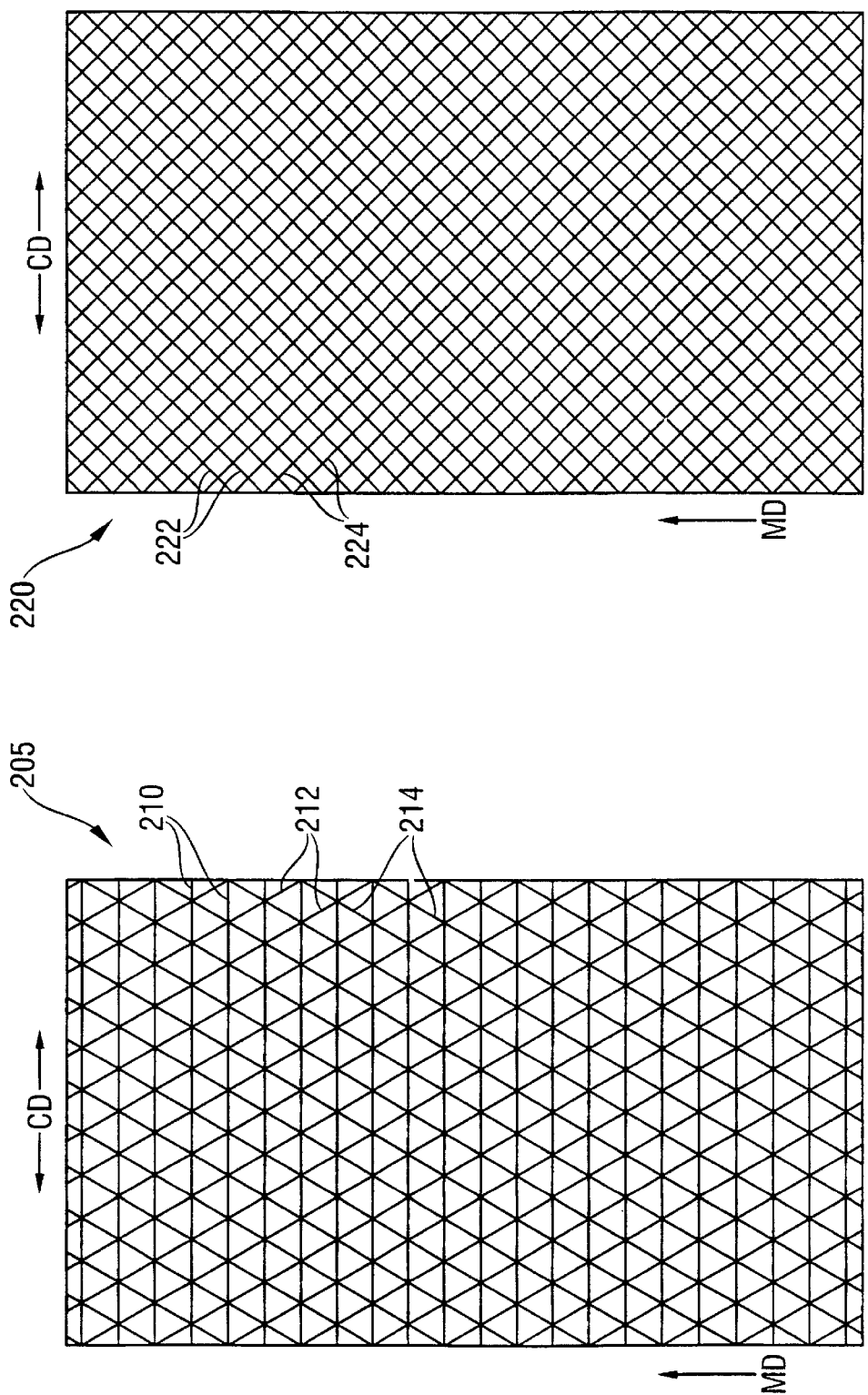

METHOD FOR MAKING A STABLE NONWOVEN WEB HAVING ENHANCED EXTENSIBILITY IN MULTIPLE DIRECTION

FIELD OF THE INVENTION

The present invention relates to stable materials having enhanced extensibility in multiple directions and a mechanical post-processing method for making the same. High extension materials, such as nonwoven webs and film webs are particularly well suited for use in disposable absorbent articles such as diapers, incontinence briefs, training pants, feminine hygiene garments, and the like, as they are able to be used in portions of the article where high extensibility can aid in the article's fit to the body.

BACKGROUND OF THE INVENTION

Nonwoven webs may be manufactured into products aid components of products so inexpensively that the product may be viewed as disposable after only one or a few uses. Representatives of such products include diapers, training pants, wipes, garments, incontinence briefs, feminine hygiene garments and the like.

Nonwoven webs may be treated to provide the nonwoven web with certain properties. For example, U.S. Pat. No. 5,244,482 issued to Hassenboehler, Jr. et al. on Sep. 14, 1993 discloses a method for treating a nonwoven web wherein the nonwoven web is heated at an elevated temperature and uniaxially drawn to consolidate and stabilize the nonwoven web. Such nonwoven webs are noted to exhibit an increased elasticity after processing. Such elasticity increase is recognized as being caused by the new "memory" instilled by the heating of the nonwoven web. For applications desiring enhanced extensibility rather than elasticity, such heating is therefore not desirable. Additionally, such drawing and setting of the nonwoven web by heating at an elevated temperature often causes fiber embrittlement and the nonwoven web to exhibit increased gloss. For many applications involving skin contact, e.g., such as in diaper coverstock, such attributes are contrary to the desired cloth-like properties of softness and non-plastic, (low gloss) appearance. Lastly, the requirement of heating the nonwoven web to consolidate and stabilize the web adds to the complexity and cost of the process.

U.S. Pat. No. 4,981,747 issued to Morman on Jan. 1, 1991, discloses a "reversibly necked" material. It is taught that the unstabilized necked material must be held under high tension on the re-wound roll until such time as the further heat setting step is performed to stabilize the material. Such a material will again suffer the deficits noted above with respect to preferred skin contact applications, and will enhance the elastic properties of the material rather than the extensible behavior of the material.

U.S. Pat. No. 5,226,992 issued to Morman on Jul. 13, 1993, discloses a method of producing a composite elastic necked-bonded material. A tensioning force is applied to at least one neckable material, such as a neckable nonwoven web, to neck or consolidate the material. Instead of heating the consolidated nonwoven web, this patent teaches superposing the tensioned consolidated nonwoven web on an elastic material and joining the tensioned consolidated nonwoven web to the elastic material while the tensioned consolidated nonwoven web is in a tensioned condition. By joining the tensioned consolidated nonwoven web to the elastic material while still in a tensioned condition, the nonwoven web is constrained to its' necked dimension. Such a procedure does not provide a means for producing a stabilized extensible web without the attachment of the nonwoven web to an additional elastic layer.

It is an object of the present invention to provide a stabilized extensible necked nonwoven web, capable of being wound into stable rolistock or festooned form, suitable for subsequent conversion or combining operations.

It is also an object of the present invention to provide a stabilized extensible necked nonwoven web, capable of very high speed extension via mechanical straining means.

It is also an object of the present invention to provide a post-processing method for producing a stabilized extensible necked nonwoven web.

It is also an object of the present invention to provide a post-processing method for producing a stabilized extensible necked nonwoven web that does not require heating of the neckable material to elevated temperatures, to enhance the extensible properties rather than the elastic properties and to substantially preserve the original properties of the neckable nonwoven web.

It is also an object of the present invention to provide a stabilized extensible material which may be easily extended in multiple directions.

As used herein, the term "elastic", refers to any material which, upon application of a biasing force, is stretchable, that is, elongatable, to at least about 60 percent (i.e., to a stretched, biased length which is at least about 160 percent of its relaxed unbiased length), and which, will recover at least 55 percent of its elongation upon release of the stretching, elongation force.

As used herein, the term "extensible" refers to any material which, upon application of a biasing force, is stretchable, that is, elongatable, to at least about 60 percent without suffering catastrophic failure (i.e., to a stretched, biased length which is at least about 160 percent of its relaxed unbiased length), but does not recover more than 55 percent of its elongation upon release of the stretching, elongation force.

As used herein, the term "highly extensible" refers to any material which, upon application of a biasing force, is stretchable, that is, elongatable, to at least about 100 percent without suffering catastrophic failure (i.e., to a stretched, biased length which is at least about 200 percent of its relaxed unbiased length), but does not recover more than 55 percent of its elongation upon release of the stretching, elongation force.

As used herein, the term "stabilized" refers to a material of the present invention which is capable of being stored in a stable condition in any common or conventional web storage manner without the need for further heating or the addition of or joinder with other webs to stabilize the material. Such storage means would include for example, low tension rolls or festooned material in boxes.

As used herein, the term "nonwoven web", refers to a web that has a structure of individual fibers or threads which are interlaid, but not in any regular repeating manner. Nonwoven webs have been, in the past, formed by a variety of processes such as, for example, meltblowing processes, spunbonding process, and bonded carded web processes.

As used herein, the term "necked material", refers to any material which has been constricted in at least one dimension by applying a tensioning force in a direction that is perpendicular to the desired direction of neck-down.

As used herein, the term "neckable material", refers to any material which can be necked.

As used herein, the term "percent neckdown", refers to the ratio determined by measuring the difference between the un-necked dimension and the stabilized necked dimensions of the neckable material in the direction of necking, and then dividing that difference by the un-necked dimension of the neckable material, then multiplying by 100.

As used herein, the term "composite elastic material", refers to a material comprising an elastic member joined to a stabilized extensible necked material. The elastic member may be joined to the stabilized extensible necked material at intermittent points or may be continuously bonded thereto. The joining is accomplished while the elastic member and the stabilized extensible necked material are in juxtaposed configuration. The composite elastic material is elastic in a direction generally parallel to the direction of neckdown of the stabilized extensible necked material and may be stretched in that direction to the breaking point of the stabilized extensible necked material. A composite elastic material may include more than two layers.

As used herein, the term "polymer", generally includes, but is not limited to, homopolymers, copolymers, such as, for example, block, graft, random, and alternating copolymers, terpolymers, etc. and blends and modifications thereof. Furthermore, unless otherwise specifically limited the term "polymer" shall include all possible molecular geometric configurations of the material. These configurations include, but are not limited to, isotactic, syndiotactic and random symmetries.

As used herein, the term "surface-pathlength" refers to a measurement along a topographic surface of the material in question in a specified direction.

SUMMARY OF THE INVENTION

In accordance with the present invention there is provided a method of producing a stabilized extensible necked material comprising the steps of:
providing a neckable material;
feeding the neckable material in a first direction;
subjecting the neckable material to incremental stretching in a direction perpendicular to the first direction;
applying a tensioning force to the neckable material to neck the material in a direction perpendicular to the first direction;
subjecting the necked material to mechanical stabilization to provide a stabilized extensible necked material;
passing the stabilized extensible necked material between a peripheral surface of a cylinder which is driven in rotating motion and a device for pressing the stabilized extensible necked material against the peripheral surface of the rotating cylinder;
retarding the passage of the stabilized extensible necked material by a retarding member; and
directing the stabilized extensible necked material away from the peripheral surface of the cylinder.

Preferably, the material is directed away from the peripheral surface of the cylinder by the retarding member a surface of which forms an acute angle with the peripheral surface of the cylinder in the direction of rotation of the cylinder.

The stabilized extensible necked material is easily extended in both a direction parallel to the first direction and in a direction perpendicular to the first direction. A preferred method for mechanically stabilizing the necked material comprises subjecting the necked material to incremental stretching in a direction generally perpendicular to the necked direction.

The method may also comprise the additional step of winding the stabilized extensible necked material onto a take-up roll or festooning the stabilized extensible necked material into box.

The method may also comprise the additional step of joining the stabilized extensible necked material to an elastic member to form a composite elastic material.

If the material is stretchable it may be necked by stretching in a direction generally perpendicular to the desired direction of neck-down. The neckable material may be any material that can be necked sufficiently at room temperature. Such neckable materials include knitted and loosely woven fabrics, bonded carded nonwoven webs, spunbonded nonwoven webs, or meltblown nonwoven webs. The neckable material may also have multiple layers such as, for example, multiple spunbonded layers and/or multiple meltblown layers or film layers. The neckable material may be made of polymers such as for example, polyolefins. Exemplary polyolefins include polypropylene, polyethylene, ethylene copolymers, propylene copolymers and blends thereof. The neckable material may be a nonelastic material such as for example a nonelastic nonwoven material.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

FIG. 10 is a plan view of an embossment pattern of the present invention which is suitable for setting the necked material; and FIG. 11 is a plan view of another embossment pattern of the present invention which is suitable for setting the necked material.

DETAILED DESCRIPTION OF THE INVENTION

Figure 1:
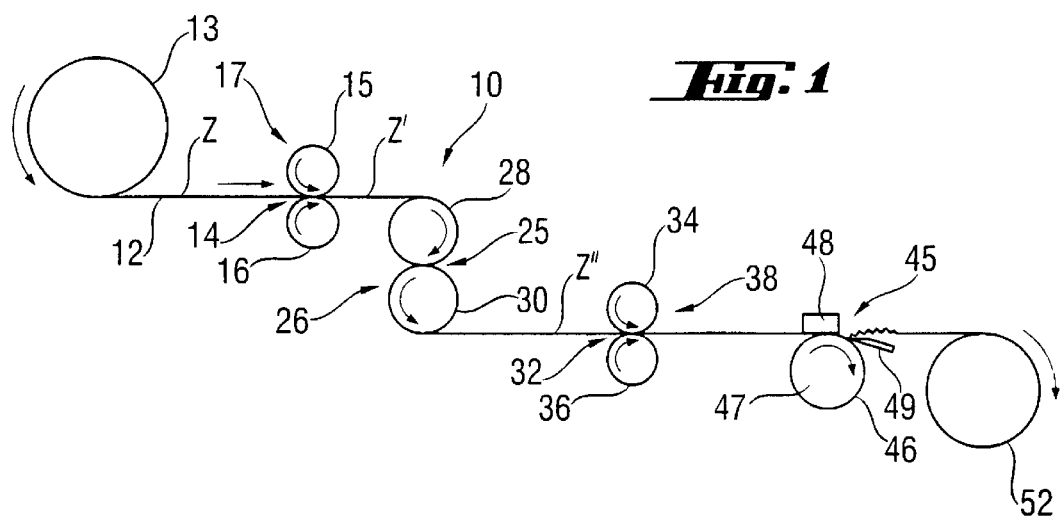
FIG. 1 is schematic illustration of an exemplary process for forming an extensible material of the present invention.

Referring to FIG. 1 there is schematically illustrated at 10 a process for forming a stabilized extensible necked material of the present invention.

According to the present invention, a neckable material 12 is unwound from a supply roll 13 and travels in the direction indicated by the arrows associated therewith as the supply roll 13 rotates in the direction indicated by the arrows associated therewith. The direction of travel of the neckable material 12 is the machine direction or first direction. From the supply roll 13 the material 12 passes through the nip 14 formed by the incremental stretching rollers 15 and 16 of the cross-machine direction web enhancement arrangement 17.

The material 12 may be formed by known nonwoven extrusion processes, such as, for example, known meltblowing processes or known spunbonding processes, and passed directly through the nip 14 without first being stored on a supply roll.

Figure 2:
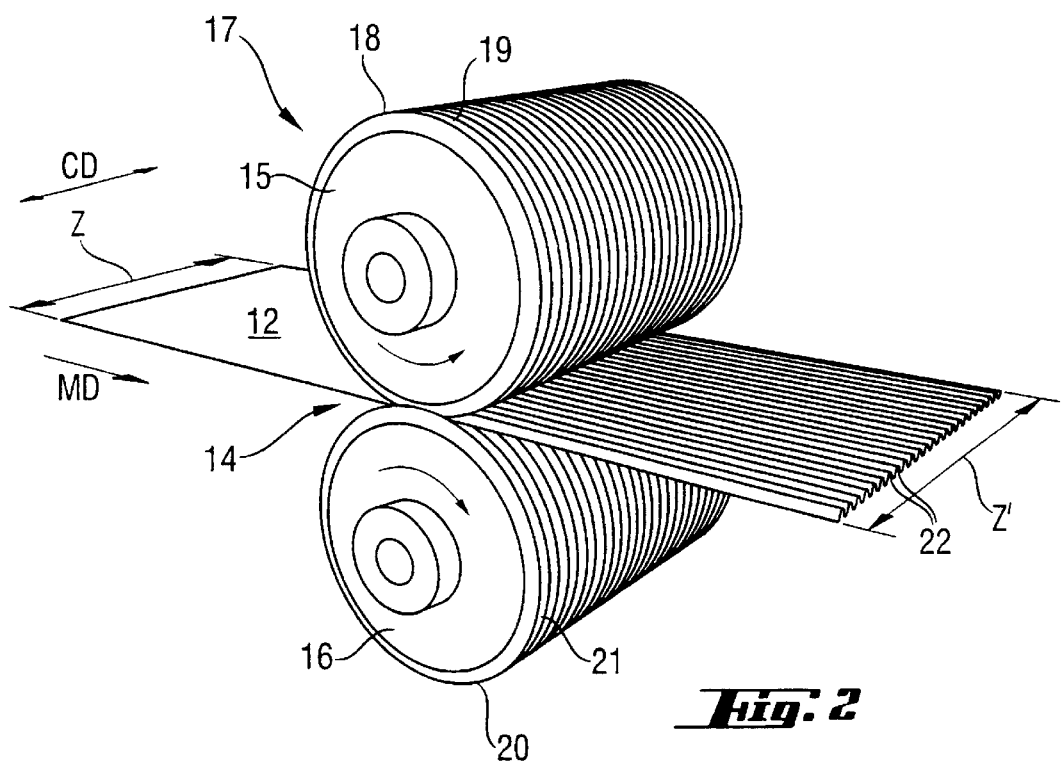
FIG. 2 is an enlarged perspective illustration of the cross-machine direction web enhancement arrangement.

FIG. 2 is an enlarged perspective illustration of a preferred embodiment of the cross-machine direction web enhancement arrangement 17 employing opposed pressure applicators having three-dimensional surfaces which at least to a degree are complimentary to one another. The cross-machine direction web enhancement arrangement 17 shown in FIG. 2 comprises incremental stretching rollers 15 and 16. The neckable nonwoven web 12 passes through the nip 14 formed by incremental stretching rollers 15 and 16 as the incremental stretching rollers rotate in the direction indicated by the arrows associated therewith. Uppermost incremental stretching roller 15 comprises a plurality of teeth 18 and corresponding grooves 19 which extend about the entire circumference of roller 15. Lowermost incremental stretching roller 16 comprises a plurality of teeth 20 and corresponding grooves 21 which extend about the entire circumference of roller 16. The teeth 18 on roller 15 intermesh with or engage the grooves 21 on roller 16, while the teeth 20 on roller 16 intermesh with or engage the grooves 19 on roller 15.

The teeth 18 and 20 on rollers 15 and 16, respectively, extend in a direction substantially parallel to the travel direction of the neckable nonwoven web 12 or in a direction substantially perpendicular to the width of the neckable nonwoven web 12. That is, teeth 18 and 20 extend in a direction parallel to the machine, MD or first direction. The incremental stretching rollers 15 and 16 incrementally stretch the nonwoven web in a direction generally perpendicular to the first or machine direction thereby causing the fibers of the nonwoven web to be oriented, at least to a degree, in the cross-machine or CD direction or perpendicular to the first direction. In addition to orienting the individual fibers of the nonwoven web in CD direction the surface-pathlength of the nonwoven web as measured in the CD direction or perpendicular to the first direction increases. As the nonwoven web 12 exits the cross-machine direction web enhancement arrangement 17 the nonwoven web 12 includes a plurality of rugosities 22. The rugosities 22 provide the nonwoven web 12 with its increased surface-pathlength as compared to the surface-pathlength of the substantially flat nonwoven web 12 prior to entering the cross-machine direction web enhancement arrangement 17.

As can be seen in FIG. 2., prior to entering the nip 14 of the cross-machine direction web enhancement arrangement 17, the nonwoven web 12 has a CD surface-pathlength dimension Z. After being subjected to the incremental stretching rollers 15 and 16 the nonwoven web 12 has a plurality of rugosities 22 which provide the nonwoven web 12 with a new CD surface-pathlength dimension Z' which is greater than CD surface-pathlength dimension Z. CD surface-pathlength dimension Z' is preferably at least about 10% greater than CD surface-pathlength dimension Z, more preferably at least about 20% greater than CD surface-pathlength dimension Z, and most preferably at least about 30% greater than CD surface-pathlength dimension Z. CD surface-pathlength dimension Z' may be as much as about 200% greater than dimension Z or more without subjecting the nonwoven web to catastrophic failure. For example, the nonwoven web 12 having a CD surface-pathlength dimension Z of 10 inches, may be expanded 50% to have a CD surface-pathlength dimension Z' of 15 inches.

The method for determining the surface-pathlength of the nonwoven web can be found in the Test Methods section set forth in subsequent portions of the present specification.

The incremental stretching rollers 15 and 16 may include any number of teeth and grooves as desired. In addition, the teeth and grooves may be nonlinear, such as for example, curved, sinusoidal, zig-zag, etc. The size and amount of engagement of teeth and grooves on incremental stretching rollers 15 and 16 may be of any desired dimension.

From the cross-machine direction web enhancement arrangement 17 the neckable nonwoven web 12 passes through a nip 25 of the S-roll arrangement 26 formed by the stack rollers 28 and 30. The neckable nonwoven web 12 passes through the nip 25 of the S-roll arrangement 26 in a reverse-S path as indicated by the rotation direction arrows associated with the stack rollers 28 and 30. From the S-roll arrangement 26 the neckable material 12 passes through the nip 32 formed by the incremental stretching rollers 34 and 36 of the mechanical stabilization arrangement 38. Because the peripheral linear speed of the rollers of the S-roll arrangement 26 is controlled to be less than the peripheral linear speed of the rollers of the mechanical stabilization arrangement 38, the neckable material 12 is tensioned between the S-roll arrangement 26 and the nip 32 of the incremental stretching rollers 34 and 36 of the mechanical stabilization arrangement 38. By adjusting the difference in the speeds of the rollers, the neckable material 12 is tensioned so that it necks a desired amount and is maintained in such a tensioned, necked condition. The mechanical stabilization arrangement 38 provides a stabilized necked material which may be joined to other materials.

As the neckable material 12 is tensioned between the S-roll arrangement 26 and the nip 32 of the incremental stretching rollers 34 and 36, tension is applied to the neckable material in a direction parallel to the first direction or parallel to the machine or MD direction. The tensioning of the neckable material 12 in a direction parallel to the first direction causes the neckable material to neck in a direction perpendicular to the first direction or in a direction parallel to the CD or cross-machine direction.

Prior to entering the nip 25 of the S-roll arrangement 26 the neckable material 12 has a cross-machine or CD surface-pathlength dimension Z' when tensioned between the S-roll arrangement 26 and the nip 32 of the incremental stretching rollers 34 and 36 the neckable material 12 is necked such that its new CD surface-pathlength dimension Z" is less than CD surface-pathlength dimension Z'. CD surface-pathlength dimension Z" is preferably less than about 75% of CD surface-pathlength dimension Z', more preferably less than about 50% of CD surface-pathlength dimension Z', most preferably less than about 30% of CD surface-pathlength dimension Z'. For example, the material 12 having a CD surface-pathlength dimension Z' of 10 inches may be necked to have a CD surface-pathlength dimension Z" of 5 inches which is 50% of the CD surface-pathlength dimension Z" of 10 inches.

The method for determining the surface-pathlength of the web can be found in the Test Methods section set forth in subsequent portions of the present specification.

Other methods of tensioning the neckable material 12 may be used such as, for example, tenter frames.

The neckable material 12 may be extensible, elastic, or nonelastic nonwoven material. The neckable material 12 may be a spunbonded web, a meltblown web, or a bonded carded web. If the neckable material is a web of meltblown fibers, it may include meltblown microfibers. The neckable material 12 may be made of fiber forming polymers such as, for example, polyolefins. Exemplary polyolefins include one or more of polypropylene, polyethylene, ethylene copolymers, propylene copolymers, and butene copolymers.

In one embodiment of the present invention, the neckable material 12 may be a multilayer material having, for example, at least one layer of a spunbonded web joined to at least one layer of a meltblown web, a bonded carded web or other suitable material. Alternatively, the neckable material 12 may be a single layer of material such as, for example, a spunbonded web, a meltblown web, or a bonded carded web.

The neckable material 12 may also be a composite material made of a mixture of two or more different fibers or a mixture of fibers and particles. Such mixtures may be formed by adding fibers and/or particulates to the gas stream in which the meltblown fibers are carried so that an intimate entangled commingling of meltblown fibers and other materials, e.g., wood pulp, staple fibers and particulates such as, for example, hydrocolloidal (hydrogel) particles commonly referred to as superabsorbent materials, occurs prior to collection of the meltblown fibers upon a collecting device to form a coherent web of randomly dispersed meltblown fibers and other materials.

The nonwoven web of fibers should be joined by bonding to form a coherent web structure which is able to withstand necking. Suitable bonding techniques include, but are not limited to, chemical bonding, thermobonding, such as point calendering, hydroentangling, and needling.

Figure 3:
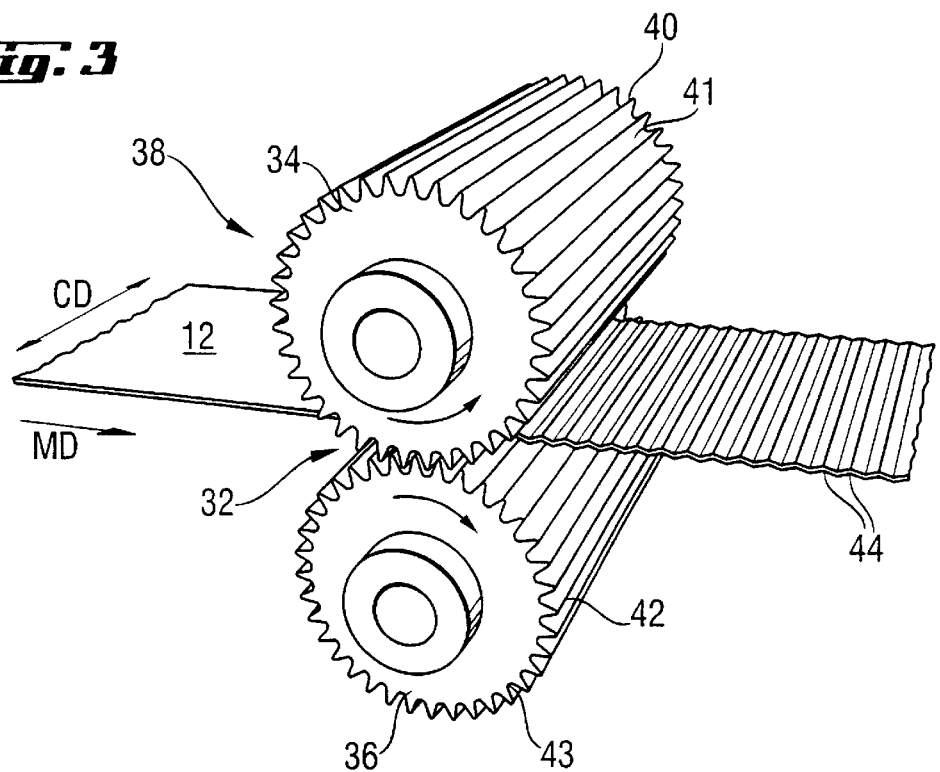
FIG. 3 is an enlarged perspective illustration of the stabilizing roller arrangement.

FIG. 3 is an enlarged perspective illustration of a preferred embodiment of the mechanical stabilization arrangement 38 employing opposed pressure applicators having three-dimensional surfaces which at least to a degree are complimentary to one another. The mechanical stabilization arrangement 38 shown in FIG. 3 comprises incremental stretching rollers 34 and 36. The neckable material 12 passes through the nip 32 formed by incremental stretching rollers 34 and 36 as the incremental stretching rollers rotate in the direction indicated by the arrows associated therewith. Uppermost incremental stretching roller 34 comprises a plurality of teeth 40 and corresponding grooves 41 which extend about the entire circumference of roller 34. Lowermost incremental stretching roller 36 comprises a plurality of teeth 42 and corresponding grooves 43 which extend about the entire circumference of roller 36. The teeth 40 on roller 34 intermesh with or engage the grooves 43 on roller 36, while the teeth 42 on roller 36 intermesh with or engage the grooves 41 on roller 34.

The teeth 40 and 42 on rollers 34 and 36, respectively, extend in a direction substantially perpendicular to the travel direction or first direction of the neckable web 12 or in a direction substantially parallel to the width of the neckable material 12. That is, teeth 40 and 42 extend in a direction parallel to the cross-machine or CD direction. The incremental stretching rollers 34 and 36 incrementally stretch the necked web in a direction generally perpendicular to the necked direction thereby stabilizing the necked material 12 such that it remains in its necked condition after passing through the incremental stretching rollers 34 and 36 and the tension on the necked material is released. By stabilizing the necked material the necked material substantially maintains its necked width without returning to its precursor width.

Figure 9:
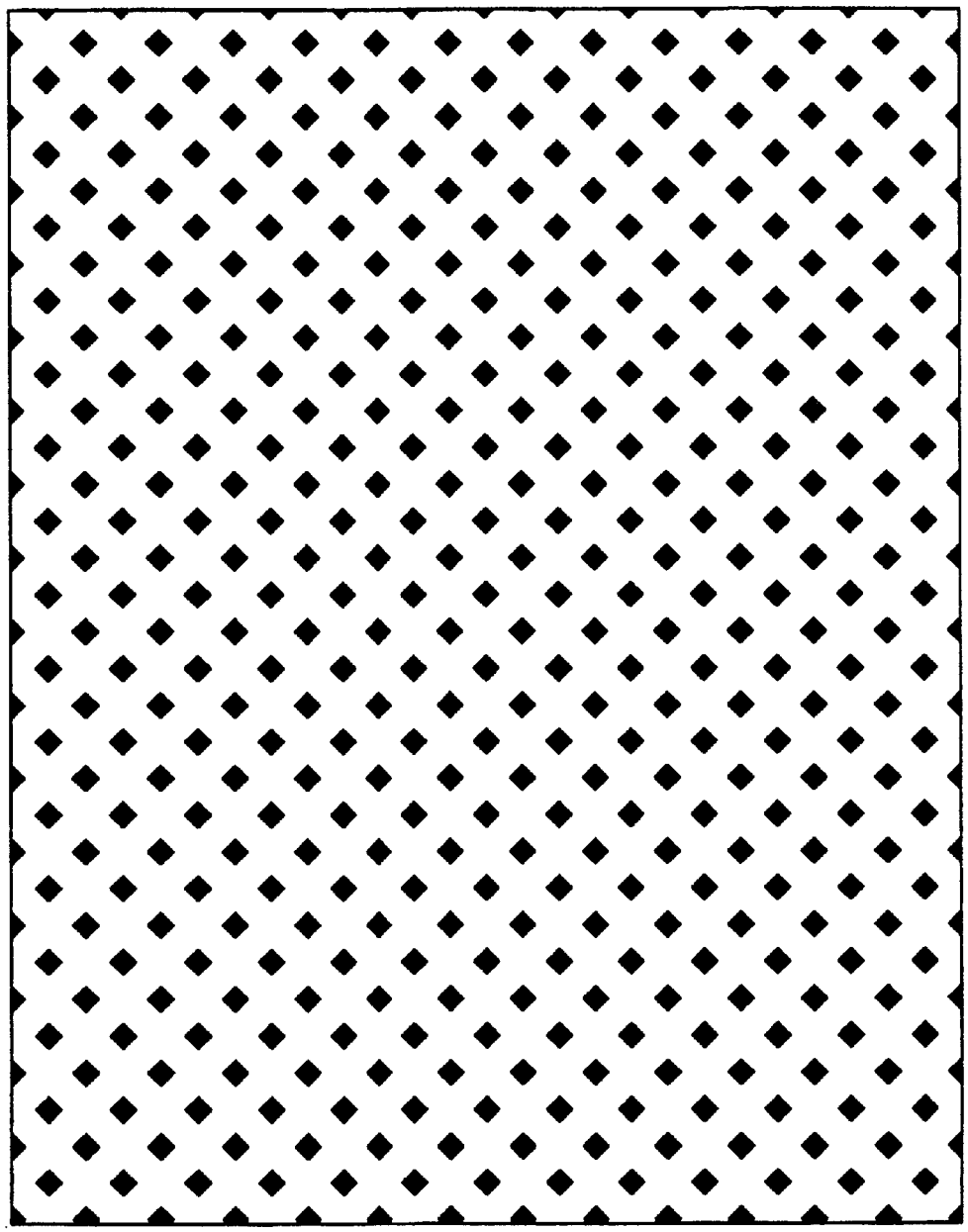
FIG. 9 is a plan view of a spaced-apart pattern of embossments which is not suitable for setting the necked material.

After being stabilized by passing through the incremental stretching rollers 34 and 36, the stabilized necked material 12 includes a plurality of stabilizing embossments 44. Stabilizing embossments 44 extend in a substantially linear direction parallel to one another across the entire width of the stabilized necked material 12. The stabilizing embossments 44 are shown to be extending in a direction substantially parallel to the CD or cross-machine direction. As seen in FIG. 3, each stabilizing embossment extends across the stabilized necked material 12 from one edge to the other edge. This is very important as this sets the fibers across the entire width of the web thereby stabilizing the web. If the stabilizing embossments 44 did not extend entirely across the neckable material 12, the portion of the neckable material that is not embossed would return to its precursor width. For example, a spaced apart pattern of embossments such as shown in FIG. 9, would not effectively set the material. The portions of the material between the individual embossments would not be set, and therefore, would allow the material to return to its precursor width.

The incremental stretching rollers 34 and 36 may include any number of teeth and grooves to provide the desired stabilization in the nonwoven web. In addition, the teeth and grooves may be nonlinear, such as for example, curved, sinusoidal, zig-zag, etc. In addition, the teeth and grooves may extend in a direction other than perpendicular to the travel direction of the neckable web. For example, the teeth and grooves may extend at an angle to the CD direction, but preferably not parallel to the MD or machine direction, as this type of incremental stretching would tend to expand the width of the web, thus defeating the purpose of the necking operation.

Figure 4:
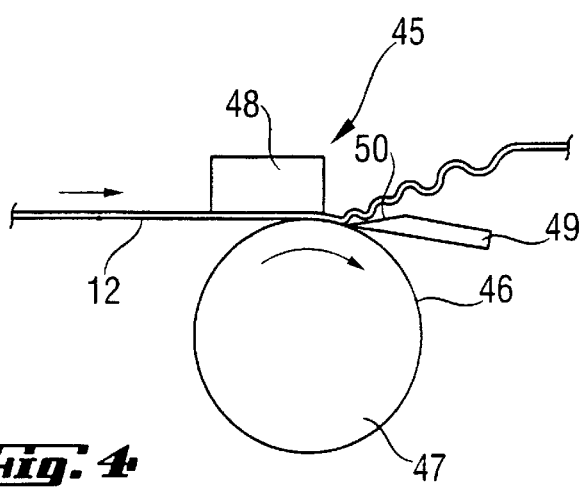
FIG. 4 is an enlarged simplified illustration of the micrexing apparatus.

After passing through the incremental stretching rollers 34 and 36 the stabilized necked material 12 is fed toward apparatus 45. FIG. 4 is an enlarged illustration of apparatus 45. Apparatus 45 provides a treatment popularly known as "micrexing". An apparatus providing the micrexing treatment similar to the apparatus 45 is produced by the Micrex Corporation of Walpole, Mass. The web 12 of extensible necked material is passed between a peripheral surface 46 of cylinder 47 which is driven in rotating motion in a direction indicated by the arrows associated therewith and a device 48 which presses the stabilized extensible necked material 12 against the peripheral surface 46 of the cylinder 47. A retarding member 49 retards the passage of the stabilized extensible necked material 12. The retarding member 49 has a surface 50 which forms an acute angle with the peripheral surface 46 of the cylinder 47 in a direction of rotation of the cylinder. The surface 50 directs the stabilized extensible necked material away from the peripheral surface of the cylinder 47. A more detailed description of the micrexing operation and apparatus is described in U.S. Pat. Nos. 3,260,778 issued to Walton on Jul. 12, 1996; U.S. Pat. No. 3,426,405 issued to Walton on Feb. 11, 1969; and U.S. Pat. No. 5,117,540 issued to Walton et al. on Jun. 2, 1992. Each of these patents are incorporated herein by reference.

Referring again to FIG. 1, after the neckable material 12 passes through the micrexing apparatus 45 it is wound up on take-up roll 52. Stabilizing the neckable material in its necked condition allows it to be wound up on a take-up roll while in its necked condition and then later used for the desired end use. Once the neckable material has been mechanically stabilized or set, it is suitable for handling on high speed conventional diaper converting equipment without the need for special handling equipment.

The stabilized necked material is easily extended in a direction parallel to the direction of necking. That is, the stabilized necked material is easily extended in the cross-machine direction or in a direction perpendicular to the first direction. The extensibility in a direction perpendicular to the first direction is provided by the necking and stabilizing steps. Additionally, the stabilized extensible necked material is easily extended in a direction parallel to the first direction. The extensibility in the first direction is provided by the micrexing operation. Accordingly, the stabilized necked and micrexed material is easily extended in two directions, i.e., in a direction parallel to the first direction and in a direction perpendicular to the first direction.

The stabilized extensible necked material is elongatable in a direction perpendicular to the first direction upon application of a biasing force to at least about 60 percent without suffering catastrophic failure, (i.e., to a stretched, biased length which is at least about 160 percent of its relaxed unbiased length). Preferably, the stabilized extensible necked material is elongatable in a direction perpendicular to the first direction upon application of a biasing force to at least about 100 percent without suffering catastrophic failure, (i.e., to a stretched, biased length which is at least about 200 percent of its relaxed unbiased length). Because the stabilized extensible necked material is extensible and not elastic, the stabilized extensible necked material does not recover more than 55 percent of its elongation upon release of the stretching, elongation force, and preferably no more than 25 percent of its elongation upon release of the stretching, elongation force.

The stabilized extensible necked material is preferably elongatable in a direction perpendicular to the first direction to at least about 60 percent and more preferably to at least about 100 percent or more without suffering catastrophic failure upon the application of a relatively low biasing force. The stabilized extensible necked material is preferably elongatable in a direction perpendicular to the first direction to at least about 60 percent and more preferably to at least about 100 percent without suffering catastrophic failure upon the application of a biasing force of less than about 300 grams, more preferably upon the application of a biasing force of less than about 200 grams, and most preferably upon the application of a biasing force of less than about 100 grams.

The stabilized extensible necked material is also elongatable in a direction parallel to the first direction upon application of a biasing force to at least about 20% without suffering catastrophic failure, (i.e., to a stretched, biased length which is at least about 120% of its relaxed unbiased length). Preferably, the stabilized extensible necked material is elongatable in a direction parallel to the first direction upon the application of a biasing force to at least about 30% without suffering catastrophic failure, (i.e., to a stretched, biased length which is at least about 130% of its relaxed unbiased length).

The stabilized extensible necked material is preferably elongatable in a direction parallel to the first direction to at least about 20% and more preferably to at least about 30% or more without suffering catastrophic failure upon the application of a relatively low biasing force. The stabilized extensible necked material is preferably elongatable in a direction parallel to the first direction to at least about 20% and more preferably to at least about 30% without suffering catastrophic failure upon the application of a biasing force of less than about 100 grams, more preferably upon the application of a biasing force of less than about 200 grams, and most preferably upon the application of a biasing force of less than about 300 grams.

Because the stabilized extensible material is elongatable in directions both parallel and perpendicular to the first direction without suffering catastrophic failure upon the application of low biasing forces, the stabilized extensible necked material is particularly well-suited for use in disposable absorbent articles such as diapers, incontinence briefs, training pants, feminine hygiene garments, and the like, as it is able to be used in portions of the article where high extensibility in multiple directions can aid in the article's fit to the body.

Conventional drive means and other conventional devices which may be utilized in conjunction with the apparatus of FIG. 1 are well known and, for purposes of clarity, have not been illustrated in the schematic view of FIG. 1.

FIG. 10 is a plan view of another suitable embossment pattern for stabilizing the neckable material. The pattern includes a plurality of linear embossments 210 extending continuously across the entire width of the web 205 in a direction generally parallel to the cross-machine direction. The pattern also includes a plurality of linear embossments 212 extending continuously across the entire width of the web 205 at an angle to the cross-machine direction and at an angle to the embossments 210. The web 205 also includes a plurality of linear embossments 214 extending continuously across the entire width of the web 205 at an angle to the cross-machine direction and at an angle to the embossments 210 and 212. The embossments 212 and 214 may extend at any angle to one another and to the embossments 210.

FIG. 11 is a plan view of another embossment pattern for stabilizing the neckable material. The pattern includes a plurality of linear embossments 222 extending continuously across the entire width of the web 220 at an angle to the cross-machine direction. The web 220 also includes a plurality of linear embossments 224 extending continuously across the entire width of the web 220 at an angle to the cross-machine direction and at an angle to the embossments 222. The embossments 222 and 224 are preferably aligned perpendicular to one another. However, other angles between the linear embossments 222 and 224 may also be employed.

The embossment pattern of FIGS. 10 and 11, is provided by feeding the necked material through a nip formed by a pair of patterned compression rollers. Each roller comprises a series of raised surfaces, similar to the teeth 40 and 42 on rollers 34 and 36, respectively. The raised surfaces on each of the rollers are complimentary and engage one another and compress the necked material providing the embossment pattern shown in FIGS. 10 and 11. The compression provided by the patterned compression rollers sets the individual fibers to stabilize the web in its necked condition.

Alternatively, the patterned compression rollers may comprise a pattern roller having a pattern of raised surfaces and an anvil roller having a smooth surface. The raised surfaces on the pattern roller compress the necked material against the anvil roller to provide the embossment pattern shown in FIGS. 10 and 11.

The stabilized extensible necked material may later be joined to an elastic member to form a composite elastic material. Preferably, the stabilized extensible necked material is joined with an elastic member while the elastic member is in a substantially untensioned condition. The stabilized extensible necked material and the elastic member may be joined to one another either intermittently or substantially continuously along at least a portion of their coextensive surfaces while the elastic member is in either a tensioned or an untensioned condition. The stabilized extensible necked material may be joined to an elastic member after having been removed from a roll, such as take-up roll 50, or may be joined to an elastic member after having been subjected to the micrexing operation.

The elastic member may be made from any suitable elastic material. Generally, any suitable elastomeric fiber forming resins or blends containing the same may be utilized for the nonwoven webs of elastomeric fibers and any suitable elastomeric film forming resins or blends containing the same may be utilized for tie elastomeric films of the invention. For example, the elastic member may be an elastomeric film made from block copolymers having the general formula A-B-A' where A and A' are each a thermoplastic polymer endblock which contains a styrenic moiety such as a poly(vinyl arene) and where B is an elastomeric polymer midblock such as a conjugated diene or a lower alkene polymer. Other exemplary elastomeric films which may be used to form the elastic sheet include polyurethane elastomeric materials such as, for example, those available under the trademark ESTANE from B.F. Goodrich & Company, polyamide elastomeric materials such as, for example, those available under the trademark PEBAX from the Rilsan Company, and polyester elastomeric materials such as, for example, those available under the trade designation Hytrel from E. I. DuPont De Nemours & Company.

A polyolefin may also be blended with the elastomeric polymer to improve the processability of the composition. The polyolefin must be one which, when blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, polypropylene copolymers, and butene copolymers.

The elastic member may also be a pressure sensitive elastomeric adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, necked nonelastic web. The elastic sheet may also be a multilayer material that may include two or more individual coherent webs or films. Additionally, the elastomeric sheet may be a multilayer material in which one or more of the layers contain a mixture of elastic and nonelastic fibers or particles.

Other suitable elastomeric materials for use as the elastic member include "live" synthetic or natural rubber including heat shrinkable elastomeric films, formed elastomeric scrim, elastomeric foams, or the like. In an especially preferred embodiment, the elastic member comprises an elastomeric scrim available from Conwed Plastics.

The relation between the original dimensions of the neckable material 12 to its dimensions after tensioning or necking and micrexing determines the approximate limits of stretch of the composite elastic material. Because the neckable material is able to stretch and return to its necked dimension in directions such as, for example, the machine direction or cross-machine direction, the composite elastic material will be stretchable in generally the same direction as the neckable material 12.

Figure 5:
FIG. 5 is a plan view of an exemplary neckable material before tensioning and necking.
Figure 6:
FIG. 6 is a plan view of an exemplary necked material.
Figure 7:
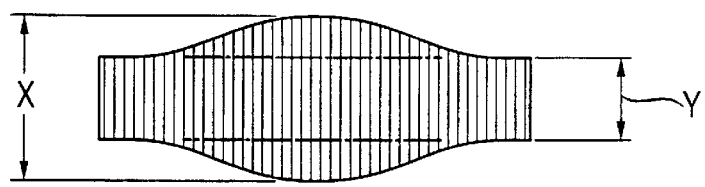
FIG. 7 is a plan view of an exemplary composite elastic material while partially stretched.

For example, with reference to FIGS. 5, 6, and 7, if it is desired to prepare a composite elastic material stretchable to a 150% elongation in multiple directions, (i.e., both parallel and perpendicular to the first direction), a width of neckable material shown schematically and not necessarily to scale in FIG. 5 having a width "X" such as, for example, 250 cm, is tensioned so that it necks down to a width "Y" of about 100 cm. The necked material shown in FIG. 6 is mechanically stabilized to provide a stabilized extensible necked material. The material is now elongatable in a direction parallel to the direction of necking, i.e., in a direction perpendicular to the first direction upon application of relatively low forces. The stabilized extensible necked material is then micrexed to provide a material which is elongatable in a direction perpendicular to the direction of necking, i.e., in a direction parallel to the first direction, upon application of relatively low forces. The stabilized extensible necked material is then joined to a 100 cm by 100 cm square shaped elastic member which is at least stretchable to a dimension of 250 cm by 250 cm. The resulting composite elastic material shown schematically and not necessarily to scale in FIG. 7 has a width "Y" of about 100 cm and is stretchable in a direction perpendicular to the first direction to at least the original 250 cm width "X" of the neckable material for an elongation of about 150%. The material is also stretchable in is a direction parallel to the first direction to at least the original 250 cm length of the neckable material for an elongation of about 150%. As can be seen from the example, the elastic limit of the elastic member needs only be as great as the minimum desired elastic limit of the composite elastic material.

Figure 8:
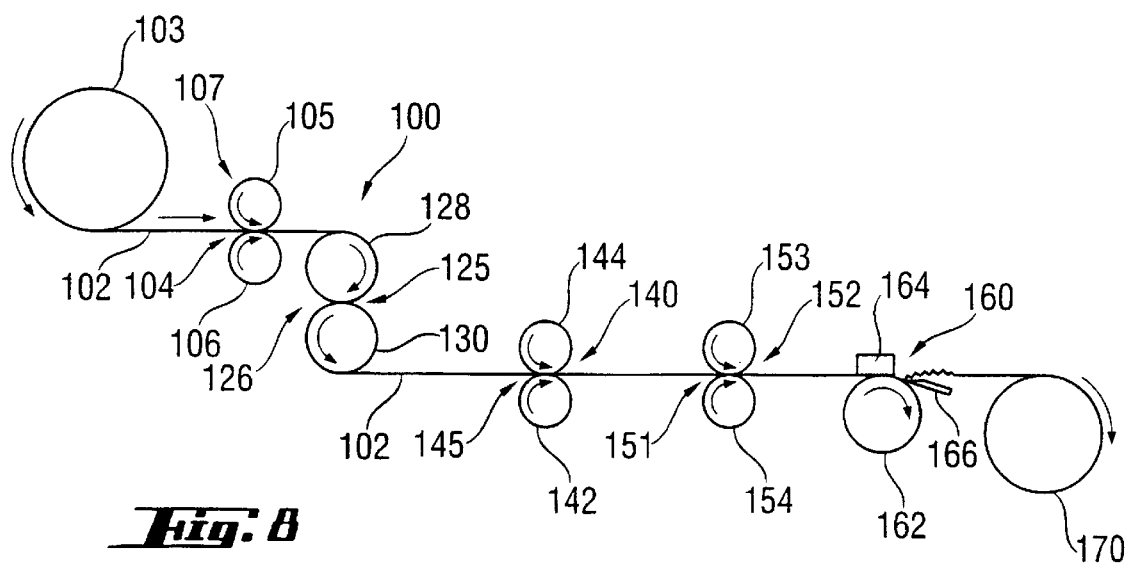
FIG. 8 is a schematic illustration of another exemplary process for forming an extensible material of the present invention.

Referring now to FIG. 8, there is schematically illustrated another process 100 for forming a necked material of the present invention.

A neckable material 102 is unwound from a supply roll 103 and travels in the direction indicated by the arrows associated therewith as the supply roll 103 rotates in the direction indicated by the arrows associated therewith. From the supply roll 103 the material 102 passes through the nip 104 formed by the incremental stretching rollers 105 and 106 of the cross-machine direction web enhancement arrangement 107.

The neckable material 102 may be formed by known nonwoven extrusion processes, such as, for example, known meltblowing processes or known spunbonding processes, and passed directly through the nip 104 without first being stored on a supply roll.

From the cross-machine direction web enhancement arrangement 107 the material 102 passes through the nip 125 of the S-roll arrangement 126 formed by the stack rollers 128 and 130. The neckable material 102 passes through the nip 125 of the S-roll arrangement 126 in a reverse-S path as indicated by the rotation direction arrows associated with the stack rollers 128 and 130. From the S-roll arrangement 126, the neckable material 102 passes through the pressure nip 145 formed by pressure roller arrangement 140 comprised of pressure rollers 142 and 144. Because the peripheral linear speed of the rollers of the S-roll arrangement 126 is controlled to be less than the peripheral linear speed of the rollers of the pressure roll arrangement 140, the neckable material 102 is tensioned between the S-roll arrangement 126 and the pressure nip of the pressure roll arrangement 140. By adjusting the difference in the speeds of the rollers, the neckable material 102 is tensioned so that it necks a desired amount and is maintained in such a tensioned, necked condition. From the pressure roller arrangement 140 the necked material 102 passes through the nip 151 formed by the mechanical stabilization arrangement 152 comprised of incremental stretching rollers 153 and 154. Because the peripheral linear speed of the rollers of the pressure roll arrangement 140 is controlled to be less than or equal to the peripheral linear speed of the rollers of the mechanical stabilization arrangement 152, the material is maintained in its tensioned and/or necked condition between the pressure roll arrangement 140 and the mechanical stabilization arrangement 152. From the mechanical stabilization arrangement 152 the neckable material is fed to the micrexing apparatus 160. The micrexing apparatus includes cylinder 162, a device 164 for pressing the material 102 against the surface of the cylinder 162 and a retarding member 166 which retards the passage of the material 102 and then directs the material away from the peripheral surface of the cylinder. After leaving micrexing apparatus 160 the stabilized necked material 102 is wound up on take-up roll 170.

Conventional drive means and other conventional devices which may be utilized in conjunction with the apparatus of FIG. 8 are well known and, for purposes of clarity, have not been illustrated in the schematic view of FIG. 8.

Test Methods

Surface-pathlength measurements of nonwoven webs are to be determined by analyzing the nonwoven webs by means of microscopic image analysis methods.

The sample to be measured is cut and separated from nonwoven web. An unstrained sample length of one-half inch is to be "gauge marked" perpendicular to the "measured edge" while attached to the web, and then accurately cut and removed from the web.

Measurement samples are then mounted onto the long-edge of a microscopic glass slide. The "measured edge" is to extend slightly (approximately 1mm) outward from the slide edge. A thin layer of pressure-sensitive adhesive is applied to the glass face-edge to provide a suitable sample support means. For a sample having deep rugosities it may be necessary to gently extend the sample (without imposing significant force) to facilitate contact and attachment of the sample to the slide edge. This allows improved edge identification during image analysis and avoids possible "crumpled" edge portions that require additional interpretation analysis.

Images of each sample are to be obtained as "measured edge" views taken with the support slide "edge on" using suitable microscopic measuring means of sufficient quality and magnification. Data is obtained using the following equipment; Keyence VH-6100 (20×Lens) video unit, with video-image prints made with a Sony Video printer Mavigraph unit. Video prints are image-scanned with a Hewlett Packard ScanJet IIP scanner. Image analysis is on a MacIntosh IICi computer utilizing the software NIH MAC Image version 1.45.

Using this equipment, a calibration image initially taken of a grid scale length of 0.500" with 0.005" increment-marks to be used for calibration setting of the computer image analysis program. All samples to be measured are then video-imaged and video-image printed. Next, all video-prints are image-scanned at 100 dpi (256-level gray scale) into a suitable Mac image-file format. Finally, each image-file (including calibration file) is analyzed utilizing Mac Image 1.45 computer program. All samples are measured with freehand line-measurement tool selected. Samples are measured on both side-edges and the lengths are recorded. Thin samples require only one side-edge to be measured. Thick samples are measured on both side-edges. Length measurement tracings are to be made along the fall gauge length of a cut sample. In some cases multiple (partially overlapping) images may be required to cover the entire cut sample. In these cases, select characteristic features common to both overlapping-images and utilize as "markers" to permit image length readings to adjoin but not overlap.

The final determination of surface-pathlength is obtained by averaging the lengths of five (5) separate ½" gauge-samples of each region. Each gauge-sample "surface-pathlength" is to be the average of both side-edge surface-pathlengths.

While the test method described above is useful for many of the webs of the present invention it is recognized that the test method may have to be modified to accommodate some webs.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing a stabilized extensible necked material comprising the steps of:

a) providing a neckable material;

b) feeding the neckable material in a first direction;

c) subjecting the neckable material to incremental stretching in a direction perpendicular to said first direction;

d) applying a tensioning force to the neckable material to neck the material in a direction perpendicular to the first direction;

e) subjecting the necked material to mechanical stabilization to provide a stabilized extensible necked material;

f) passing said stabilized extensible necked material between a peripheral surface of a cylinder which is driven in rotating motion and a device for pressing the stabilized extensible necked material against the peripheral surface of the cylinder;

g) retarding the passage of stabilized extensible necked material by a retarding member; and h) directing the stabilized extensible necked material away from the peripheral surface of the cylinder.

2. The method of claim 1 further comprising the additional step of:

i) winding the stabilized extensible necked material onto a take-up roll.

3. The method of claim 1 further comprising the additional step of:

i) festooning the stabilized extensible necked material into a box.

4. The method of claim 1 wherein said stabilized extensible necked material comprises a plurality of linear embossments extending continuously across the entire width of the stabilized extensible necked material.

5. The method of claim 1 wherein said mechanical stabilization comprises feeding the necked material through a nip formed by a pair of patterned compression rollers.

6. The method of claim 5 wherein said patterned compression rollers provide a continuous compression stabilizing embossment across the entire width of the material.

7. The method of claim 1 wherein the stabilized extensible necked material is directed away from the peripheral surface of the cylinder by the retarding member.

8. The method of claim 7 wherein said retarding member has a surface which forms an acute angle with the peripheral surface of the cylinder in the direction of rotation of the cylinder.

9. The method of claim 1 further comprising the additional step of:

i) joining the stabilized extensible necked material to an elastic member.

10. The method of claim 9 wherein the elastic member comprises an elastomeric polymer selected from the group consisting of elastic polyesters, elastic polyurethanes, elastic polyamides, and elastic A-B-A' block copolymers wherein A and A' are the same or different thermoplastic polymer, and wherein B is an elastomeric polymer block.

11. The method of claim 9 wherein said elastic member comprises an elastomeric film.

12. The method of claim 9 wherein said elastic member comprises an elastomeric scrim.

13. The method of claim 1 wherein step e) comprises subjecting the necked material to incremental stretching.

14. The method of claim 13 wherein said incremental stretching comprises feeding the necked material through a nip formed by a pair of incremental stretching rollers.

15. The method of claim 14 wherein each said incremental stretching roller comprises a plurality of teeth and a plurality of grooves.

16. The method of claim 1 wherein said neckable material is a web selected from the group consisting of a bonded carded web of fibers, a web of spunbonded fibers, a web of meltblown fibers, and a multilayer material including at least one of said webs.

17. The method of claim 16 wherein said fibers comprise a polymer selected from the group consisting of polyolefins, polyesters, and polyamides.

18. The method of claim 17 wherein said polyolefin is selected from the group consisting of one or more of polyethylene, polypropylene, polybutene, ethylene copolymers, propylene copolymers, and butene copolymers.

19. The method of claim 18 wherein said neckable material is a composite material comprising a mixture of fibers and one or more other materials selected from the group consisting of wood pulp, staple fibers, particulates, and super-absorbent materials.

* * * * *

UNITED STATES PATENT AND TRADEMARK OFFICE
CERTIFICATE OF CORRECTION

PATENT NO. : 6,506,329 B1
DATED : January 14, 2003
INVENTOR(S) : John Joseph Curro et al.

It is certified that error appears in the above-identified patent and that said Letters Patent is hereby corrected as shown below:

Title page,
Item [75], Inventors, should read -- Douglas Herrin Benson and John Joseph Curro --.

Column 1,
Line 18, delete "aid" and insert -- and --.

Column 2,
Line 6, delete "rolistock" and insert -- rollstock --.

Column 11,
Line 8, delete "tie" and insert -- the --.

Column 13,
Line 62, delete "fall" and insert -- full --.

Signed and Sealed this

Seventh Day of February, 2006

JON W. DUDAS
*Director of the United States Patent and Trademark Office*